United States Patent Office 2,766,817
Patented Oct. 16, 1956

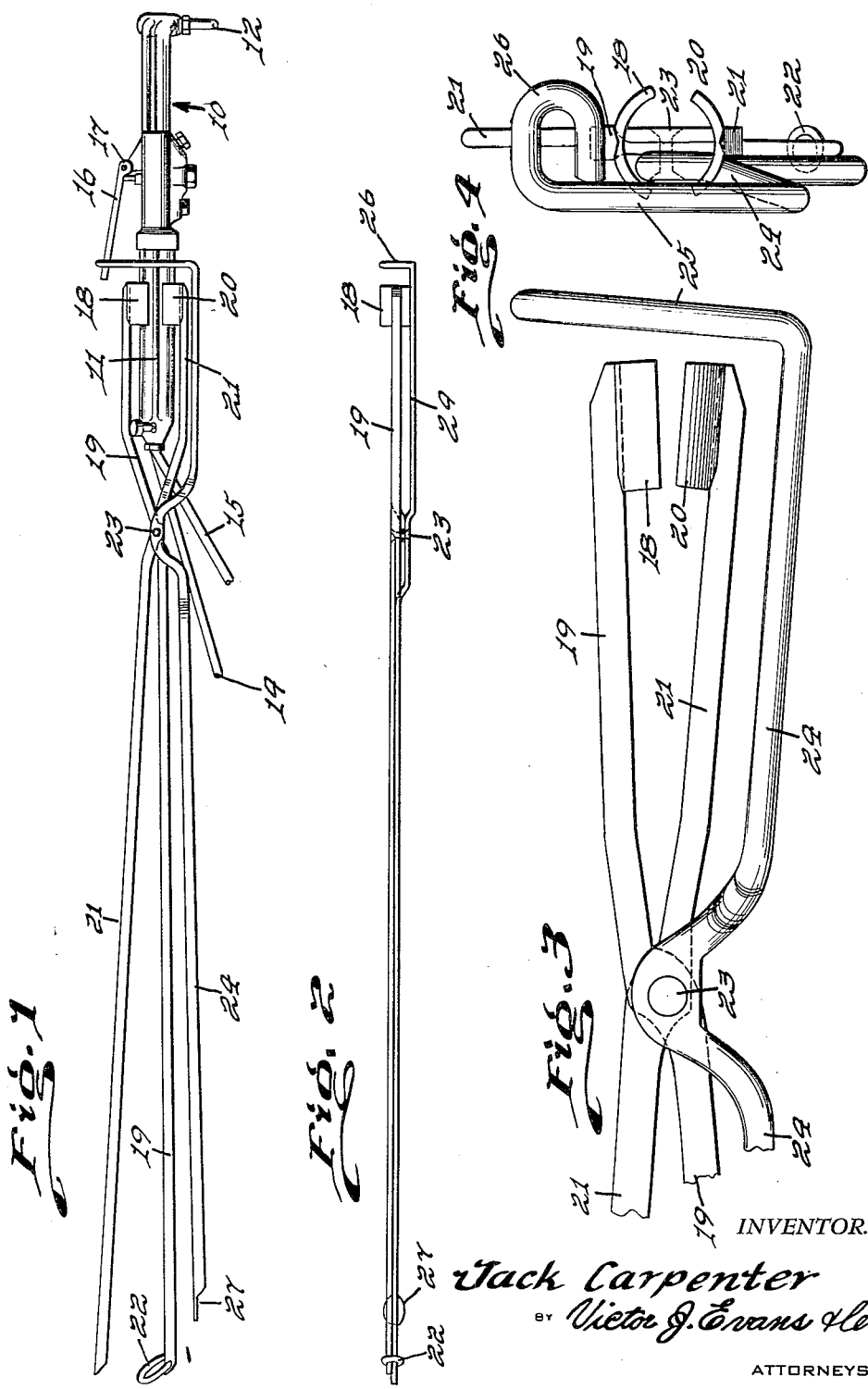

2,766,817

CUTTING TORCH HOLDER

Jack Carpenter, Walbridge, Ohio

Application September 30, 1954, Serial No. 459,378

4 Claims. (Cl. 158—27.4)

This invention relates to a cutting torch, such as an acetylene torch, and more particularly to an extensible holder for such a torch.

The object of the invention is to provide an extensible holder for a cutting torch whereby the torch can be used in hard to get at localities or objects.

Another object of the invention is to provide a cutting torch holder which includes a pair of jaws that are mounted for movement into and out of engagement with the cutting torch by means of elongated handles and wherein there is provided an elongated arm for actuating the control valve of the cutting torch so that the torch can be used in hard to get at places such as high areas or low spots so that the use of the torch in such ordinarily inaccessible locations is greatly facilitated.

A further object of the invention is to provide an extensible holder for a cutting torch which is extremely simple and inexpensive to manufacture.

Other objects and advantages will be apparent during the course of the following description.

In the accompanying drawings, forming a part of this application, and in which like numerals are used to designate like parts throughout the same;

Figure 1 is a side elevational view showing the extensible holder engaging a cutting torch.

Figure 2 is a top plan view of the extensible holder.

Figure 3 is an enlarged fragmentary elevational view showing the front portion of the extensible holder.

Figure 4 is an end elevational view of the extensible holder.

Referring in detail to the drawings, the numeral 10 designates a conventional cutting torch which may be of the acetylene type, and the torch 10 includes a housing 11 which has a burner nozzle 12 on its front end. Conduits 14 and 15 are connected to the housing 11 for supplying air and gaseous fuel such as acetylene to the torch. The torch further includes the usual lever 16 which is pivotally connected to the housing by means of a pin 17, and the lever 16 can be used for controlling the flow of gaseous medium through the housing.

The present invention is directed to an extensible holder which is adapted to be used for gripping the torch 10 when the torch is to be used in hard to reach locations. The holder of the present invention includes a pair of jaws 18 and 20 which are of arcuate shape, Figure 4, and these jaws are mounted for movement towards and away from each other so that the housing 11 can be engaged and clamped therebetween as shown in Figure 1. The jaw 18 is secured in any suitable manner, as for example by welding, to the front end of a first handle or bar 19, while the second jaw 20 is secured to the front end of a second handle bar 21. A pivot pin 23 pivotally connects the pair of bars 19 and 21 together, Figures 1 and 3. Mounted on the rear end of the bar 19 is a loop or bracket 22, and the loop 22 can be arranged in engagement with the adjacent end portion of the bar 21 in order to maintain these members immobile in their adjusted positions. The bar or arm 24 is also pivotally mounted on the common pivot pin 23.

The arm 24 has its front end shaped to provide a finger 25 which may be arranged at right angles with respect to the arm 24. The end of the finger 25 is shaped to provide a loop or eye 26 through which extends the lever 16 so that by manually pivoting the arm 24, the lever 16 can be pivoted about the pin 17 whereby the flame of the torch can be controlled while the torch is being held by the bars 19 and 21. The rear end of the arm 24 may be provided with a flattened portion 27 which provides a hand grip for facilitating the using of the arm.

From the foregoing it is apparent that there has been provided an extensible support or holder for a cutting torch. In use when the torch is to be used in high, low or other hard to reach places, the jaws 18 and 20 are arranged in engagement with the housing 11 of the torch 10, and these jaws are maintained clamped onto the housing by manually pressing the jaws together by means of the handles 19 and 21 which are manually pressed together. The valve lever 16 can be pivoted by manually moving the arm 24 so that a great amount of additional reach is afforded when using the torch such as the acetylene torch 10. When the torch is to be used in the regular manner, manual pressure on the bars 19 and 21 is released whereby the jaws 18 and 20 can be readily disengaged from the torch and also the eye 26 is disengaged from the lever 16 so that the support or holder can be removed until needed. The support is not permanently attached to the cutting torch but is only held clamped thereto by means of the jaws 18 and 20. The torch can be used for cutting metals or other materials which may be in hard to get at places, as for example high or low objects or where articles are close together. With this extension holder, it will not be necessary to build a scaffold or use ladders to reach such places. The lever 16 regulates the air for the acetylene torch.

I claim:

1. In combination with a cutting torch of the type including a housing having supply conduits connected thereto, a nozzle arranged on the front of said housing, a valve lever pivotally connected to said housing, an extensible support for said torch including a pair of arcuate jaws engaging the outer surface of said housing, a pair of handle bars having their front ends secured to said jaws for moving said jaws towards and away from each other, a pin pivotally connecting said pair of bars together, and manually operable means for actuating said valve lever, said manually operable means comprising an arm pivotally mounted on said pin, a finger extending transversely with respect to the front end of said arm, and a loop on the end of said finger for the projection therethrough of said lever.

2. In combination with a cutting torch of the type including a housing having supply conduits connected thereto, a nozzle arranged on the front of said housing, a valve lever pivotally connected to said housing, an extensible support for said torch including a pair of arcuate jaws engaging the outer surface of said housing, a pair of handle bars having their front ends secured to said jaws for moving said jaws towards and away from each other, a pin pivotally connecting said pair of bars together, and manually operable means for actuating said valve lever, said manually operable means comprising an arm pivotally mounted on said pin, a finger extending transversely with respect to the front end of said arm, and a loop on the end of said finger for the projection therethrough of said lever, and a bracket on the rear end of one of said bars for selectively receiving the adjacent end of the other bar.

3. An extensible holder for a cutting torch comprising a pair of arcuate jaws mounted for movement towards and away from each other, a pair of handle bars having their front ends secured to said jaws for moving said jaws, a pin pivotally connecting said bars together intermediate their ends, manually operable means on said pin for actuating a valve control lever of a cutting torch, and said manually operable means comprising an arm pivotally mounted on said pin, a finger extending transversely with respect to the front end of said arm, and a loop on the end of said finger.

4. An extensible holder for a cutting torch comprising a pair of jaws mounted for movement towards and away from each other, a pair of handle bars secured to said jaws for moving said jaws, a pin pivotally connecting said bars together, manually operable means on said pin for actuating a valve control lever of a cutting torch, and said manually operable means comprising an arm pivotally mounted on said pin, a finger extending transversely with respect to the front end of said arm, and a loop on said finger.

No references cited.